(12) United States Patent
Keir

(10) Patent No.: US 11,273,906 B2
(45) Date of Patent: Mar. 15, 2022

(54) REDUNDANT FLY-BY-WIRE SYSTEMS WITH FAULT RESILIENCY

(71) Applicant: HONEYWELL INTERNATIONAL INC., Morris Plains, NJ (US)

(72) Inventor: Michael Keir, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 322 days.

(21) Appl. No.: 16/530,857

(22) Filed: Aug. 2, 2019

(65) Prior Publication Data

US 2021/0171187 A1 Jun. 10, 2021

Related U.S. Application Data

(60) Provisional application No. 62/846,370, filed on May 10, 2019.

(51) Int. Cl.
*B64C 13/50* (2006.01)
*B64C 19/00* (2006.01)
*G05D 1/10* (2006.01)
*B64C 29/00* (2006.01)

(52) U.S. Cl.
CPC ............ *B64C 13/503* (2013.01); *B64C 19/00* (2013.01); *G05D 1/102* (2013.01); *B64C 29/00* (2013.01); *B64D 2221/00* (2013.01)

(58) Field of Classification Search
CPC .................................................... B64C 13/503
See application file for complete search history.

(56) References Cited

U.S. PATENT DOCUMENTS

| | | | |
|---|---|---|---|
| 4,644,538 A | 2/1987 | Cooper et al. | |
| 5,493,497 A | 2/1996 | Buus | |
| 5,806,805 A * | 9/1998 | Elbert | B64C 13/42 244/195 |
| 7,031,810 B2 | 4/2006 | Foch et al. | |
| 7,337,044 B2 * | 2/2008 | Platzer | G05D 1/0077 701/3 |
| 8,538,602 B2 | 9/2013 | Brot | |
| 8,690,101 B2 | 4/2014 | Ahmad et al. | |

(Continued)

FOREIGN PATENT DOCUMENTS

| | | |
|---|---|---|
| DE | 102011115360 A1 | 4/2013 |
| EP | 1443399 A1 | 8/2004 |
| WO | 9529434 A1 | 11/1995 |

OTHER PUBLICATIONS

Wilkens, Redundant Fly-By-Wire Systems with Fault Resiliency, filed on Jul. 30, 2018 and assigned U.S. Appl. No. 16/048,612.

(Continued)

*Primary Examiner* — Michael A Berns
(74) *Attorney, Agent, or Firm* — Lorenz & Kopf, LLP

(57) ABSTRACT

Aircraft fly-by-wire systems and related vehicle electrical systems are provided. A vehicle electrical system includes a bus arrangement having a plurality of buses, a first control module coupled to a first subset of the buses, a second control module coupled to a second subset of the buses, and a third control module coupled to a third subset of the buses. The first subset includes a first bus, a second bus, a third bus, and a fourth bus, the second subset includes the third bus, the fourth bus, a fifth bus, and a sixth bus, and the third subset includes the first bus, the second bus, the fifth bus and the sixth bus.

20 Claims, 2 Drawing Sheets

(56) References Cited

U.S. PATENT DOCUMENTS

| | | | |
|---|---|---|---|
| 9,081,372 B2* | 7/2015 | Fervel | G05B 9/03 |
| 9,740,178 B2* | 8/2017 | Debouk | G05B 9/02 |
| 9,873,505 B2 | 1/2018 | Bara et al. | |
| 10,340,820 B2* | 7/2019 | Woodworth | B64C 39/024 |
| 10,382,225 B2* | 8/2019 | Dormiani | B64C 13/505 |
| 10,650,621 B1* | 5/2020 | King | H04L 67/10 |
| 10,884,956 B2* | 1/2021 | Chang | G06F 13/1663 |
| 2006/0100750 A1 | 5/2006 | Platzer et al. | |
| 2011/0251739 A1* | 10/2011 | Tomas | G05D 1/0077 |
| | | | 701/3 |
| 2017/0109297 A1 | 4/2017 | Chang et al. | |
| 2018/0186464 A1 | 7/2018 | Woodworth et al. | |
| 2019/0036732 A1 | 8/2019 | Dormiani et al. | |
| 2020/0109811 A1* | 4/2020 | Hernandez | B05C 7/08 |
| 2021/0171187 A1* | 6/2021 | Keir | B64C 19/00 |

OTHER PUBLICATIONS

Wilkens, Fly-By-Wire Systems and Related Operating Methods, filed on Feb. 19, 2019 and assigned U.S. Appl. No. 16/279,552.
B. Dolega & P. Rzucidto (2007) Controllers for fault tolerant actuators, Aviation, 11:1, 23-27.

* cited by examiner

REDUNDANT FLY-BY-WIRE SYSTEMS WITH FAULT RESILIENCY

CROSS-REFERENCE TO RELATED APPLICATION

This application claims the benefit of U.S. provisional patent application Ser. No. 62/846,370, filed May 10, 2019, the entire content of which is incorporated by reference herein.

TECHNICAL FIELD

The subject matter described herein relates generally to aircraft systems, and more particularly, embodiments of the subject matter relate to redundant fly-by-wire systems configured to achieve fault resiliency for vertical take-off and landing (VTOL) aircraft.

BACKGROUND

In some modern aircraft, traditional mechanical flight control systems have been replaced with electrically controlled actuators, often referred to as fly-by-wire. Instead of mechanical linkages between cockpit controls and flight control surfaces, propulsion systems and/or lift systems, electrical signals are utilized to communicate movements of cockpit controls to the controllers associated with the appropriate flight control components or systems. For safety purposes, fly-by-wire systems often employ redundancy to ensure they are fail operational; however, this often increases the amount of wiring and interfaces required. For smaller aircraft, such as air taxis or other urban air mobility (UAM) vehicles, it is often desirable to minimize the amount of wiring, weight, and associated costs. However, eschewing fully redundant wiring may undesirably result in failure modes that are inadequate for non-conventional aircraft, such as vertical take-off and landing (VTOL) aircraft. Accordingly, it is desirable to also minimize the impact on the availability of flight control components in response to fault conditions. Other desirable features and characteristics will become apparent from the subsequent detailed description and the appended claims, taken in conjunction with the accompanying drawings and the foregoing technical field and background.

BRIEF SUMMARY

Vehicle electrical systems suitable for use with an aircraft are provided. One exemplary fly-by-wire electrical system suitable for use with a vehicle includes a bus arrangement comprising a plurality of buses, a first control module coupled to a first subset of the plurality of buses, the first subset including a first bus, a second bus, a third bus, and a fourth bus, a second control module coupled to a second subset of the plurality of buses, the second subset including the third bus, the fourth bus, a fifth bus, and a sixth bus, and a third control module coupled to a third subset of the plurality of buses, the third subset including the first bus, the second bus, the fifth bus and the sixth bus. The first, second and third subsets are different from one another. The controllers of the flight control components are coupled to two of the six buses. In one or more exemplary embodiments, the buses are realized as controller area network (CAN) buses. In one or more exemplary embodiments, the flight control component is a component of an aircraft having vertical take-off and landing (VTOL) capabilities, such as, for example, a lift fan. In some embodiments, the controllers of the flight control components are not connected to bus pairings of the first and second bus, the third and fourth bus, or the fifth and sixth bus.

Other desirable features and characteristics of the method and system will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to electrically-controlled vehicle systems. For purposes of explanation, the subject matter is described herein primarily in the context of aircraft where flight control components are controlled using electrical signals, however, the subject matter is not necessarily limited to use with aircraft and may be implemented in an equivalent manner for other types vehicles (e.g., automotive vehicles, marine vessels, or the like).

Figure 1:
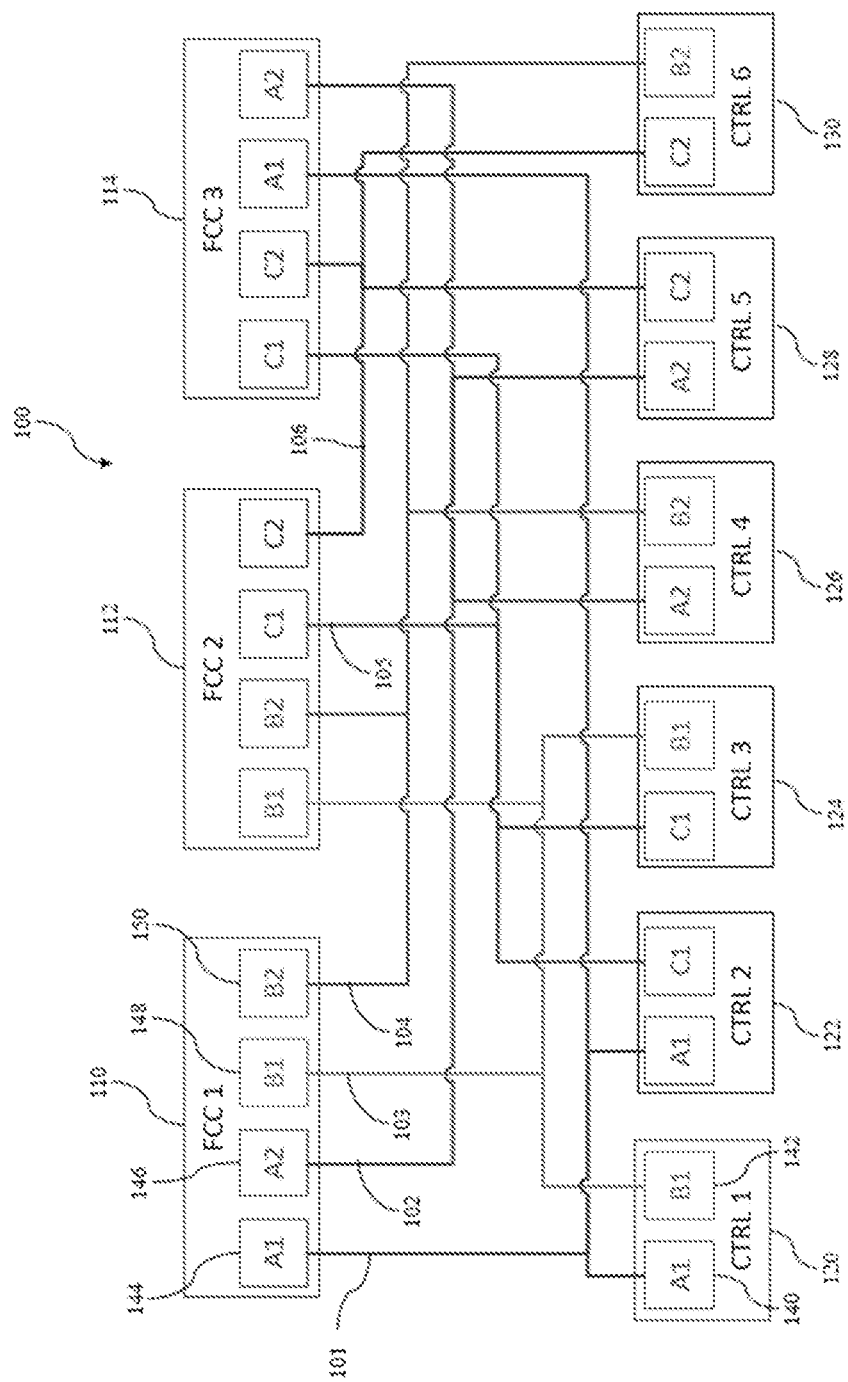
FIG. 1 is a block diagram illustrating a fly-by-wire system suitable for use with an aircraft in accordance with one or more exemplary embodiments.

FIG. 1 depicts an exemplary embodiment of a fly-by-wire system 100 suitable for use with an aircraft. The fly-by-wire system 100 includes a plurality of communications buses 101, 102, 103, 104, 105, 106, a plurality of flight control modules 110, 112, 114, and a plurality of controllers 120, 122, 124, 126, 128, 130 associated with a plurality of flight control components. In the illustrated embodiment, the first flight control module 110 is coupled to a first subset of the buses (e.g., buses 101, 102, 103 and 104), the second flight control module 112 is coupled to a second subset of the buses (e.g., buses 103, 104, 105 and 106), and the third flight control module 114 is coupled to a third subset of the buses (e.g., buses 101, 102, 105 and 106), with each of the subsets of buses being unique, distinct, or otherwise different from one another. In other words, none of the flight control modules 110, 112, 114 are coupled to a common subset of the buses 101, 102, 103, 104, 105, 106, and each of the flight control modules 110, 112, 114 is isolated from at least two of the buses 101, 102, 103, 104, 105, 106 by the absence of a physical electrical connection with the respective isolated bus (e.g., the first flight control module 110 is isolated from the fifth and sixth buses 105, 106, the second flight control module 112 is isolated from the first and second buses 101, 102, and the third flight control module 114 is isolated from the third and fourth buses 103, 104).

It should be noted that although FIG. 1 depicts a fly-by-wire system 100 that includes six buses 101, 102, 103, 104, 105, 106 and three flight control computers 110, 112, 114, it will be appreciated that the subject matter described herein is not necessarily limited to any particular number of buses, flight control computers, or controllers 120, 122, 124, 126, 128, 130. For example, other embodiments may include more than three flight control computers, and/or more than one controller per flight control component, as may be desired to achieve a desired level of redundancy or reliability for a particular application.

In the exemplary embodiments, the controllers 120, 122, 124, 126, 128, 130 manage flight control components which provide lift, propulsion, and/or attitude control for the aircraft, such as, for example, a flight control surface actuator, lift fan, motor, or similar flight control component capable of adjusting or otherwise influencing a position or orientation of the aircraft. In this regard, in one or more embodiments, each controller 120, 122, 124, 126, 128, 130 manages a unique flight control component (or a set of flight control components) that is different from those managed by other controllers 120, 122, 124, 126, 128, 130. That said, other embodiments may employ redundancy where more than one controller 120, 122, 124, 126, 128, 130 is capable of operating a common flight control component. In the exemplary embodiments, each controller 120, 122, 124, 126, 128, 130 is coupled to a distinct or unique subset of the buses 101, 102, 103, 104, 105, 106 relative to the other controllers 120, 122, 124, 126, 128, 130. In one or more embodiments, the buses 101, 102, 103, 104, 105, 106 are logically grouped or paired with one another (e.g., a first pairing of the first bus 101 and the second bus 102, a second pairing of the third bus 103 and the fourth bus 104, and a third pairing of the fifth bus 105 and the sixth bus 106), and none of the controllers 120, 122, 124, 126, 128, 130 are connected to both buses of a respective bus pairing. For example, the first controller 120 may be connected to the first bus 101 and the third bus 103 while the second controller 122 is connected to buses 101 and 105, the third controller 124 is connected to buses 103 and 105, the fourth controller 126 is connected to buses 102 and 104, the fifth controller 128 is connected to buses 102 and 106, and the sixth controller 130 is connected to buses 104 and 106.

In the exemplary embodiments, each of the controllers is coupled to at least two of the flight control modules 110, 112, 114, such that the respective controllers 120, 122, 124, 126, 128, 130 is coupled to each of the flight control modules 110, 112, 114 without triplicate bus connections or interfaces at the controllers 120, 122, 124, 126, 128, 130. At the same time, in the exemplary embodiments where there are six buses 101, 102, 103, 104, 105, 106 in a dual triplex arrangement, each of the controllers 120, 122, 124, 126, 128, 130 is isolated from four of the buses 101, 102, 103, 104, 105, 106 by the absence of a physical electrical connection with the respective isolated buses.

The flight control modules 110, 112, 114 generally represent the processing system, processing device, hardware, circuitry, logic, software, firmware and/or other components configured to receive signals indicative of a sensed or measured position, orientation, or adjustment to user interface devices in the cockpit of the aircraft and convert the inputs or adjustments received at the user interface devices into corresponding command signals for one or more flight control components and output or otherwise provide the command signals to the one or more flight control components via the subset of buses 101, 102, 103, 104, 105, 106 that the respective flight control module 110, 112, 114 is coupled to. For purposes of explanation, the flight control modules 110, 112, 114 may alternatively be referred to herein as flight control computers (FCC). Each flight control computer 110, 112, 114 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 110, 112, 114 may include or access a data storage element (or memory) capable of storing programming instructions for execution that, when read and executed by the flight control computer 110, 112, 114, cause the flight control computer 110, 112, 114 to support operations of the fly-by-wire system 100.

The cockpit user interface devices onboard the aircraft could be realized as a keypad, touchpad, keyboard, mouse, touch panel (or touchscreen), joystick, lever, switch, knob, line select key or another suitable device adapted to receive input from a user. For example, the cockpit user interface devices may be realized as joysticks including respective sets of redundant sensors configured to sense the position of a respective joystick in a first reference direction (e.g., a horizontal or x-reference direction) and additional sets of sensors configured to sense the position of the respective joystick in a second reference direction (e.g., a vertical or y-reference direction), with each sensor of each set being coupled to one of the flight control computers. It should be noted that although the subject matter may be described herein primarily in the context of sensor data associated with pilot inputs or other input received via user interface devices utilized to operate flight control components in fly-by-wire aircraft, the subject matter described herein is not intended to be limited to sensor data or any particular type of sensing arrangement, and may be utilized in the context of other sensors (e.g., inertial reference sensors) or any other type of measurement or command data (e.g., flight plan data) that may be input to a flight control module for purposes of determining flight control component commands. Accordingly, the subject matter may be implemented in an equivalent manner for autonomously or remotely controlled aircraft. One or more exemplary arrangements of cockpit user interface devices, sensors, and flight control computers are described and depicted in U.S. patent application Ser. No. 16/048,612, which is incorporated by reference herein.

One or more avionics systems are also communicatively coupled to each of the flight control computers 110, 112, 114 via a data bus. The avionics systems support navigation, flight planning, and other aircraft control functions in a conventional manner and provide real-time data and/or information regarding the operation of the aircraft to the flight control computers 110, 112, 114 for analysis in conjunction with the sensed user interface device data received from the sensors. Practical embodiments will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. One or more exemplary arrangements of avionics systems and flight control computers are described and depicted in U.S. patent application Ser. No. 16/048,612, which is incorporated by reference herein.

Based on the data or information received from the respective avionics systems and the sensed position or adjustment to a respective user interface device, each of the flight control computers 110, 112, 114 redundantly determines commands for controlling the position of or otherwise operating one or more of the flight control components to adjust the position and/or attitude of the aircraft. The controllers 120, 122, 124, 126, 128, 130 generally represent the processing system, processing device, hardware, circuitry, logic, software, firmware and/or other components of the respective systems 120, 122, 124, 126, 128, 130 that are capable of receiving a command for the respective flight control components and generating corresponding commands for operating the motor or other actuator associated therewith to adjust or otherwise control the respective flight control component to track the commands provided by one or more of the flight control computers 110, 112, 114. In this regard, the controllers may be implemented or realized using any suitable processing system and/or device, such as, for example, one or more processors, central processing units (CPUs), controllers, microprocessors, microcontrollers, processing cores and/or other hardware computing resources configured to support the operation described herein.

In the exemplary embodiments, each of the buses 101, 102, 103, 104, 105, 106 is realized as a Controller Area Network (CAN) bus, with each of the flight control computers 110, 112, 114 and controllers 120, 122, 124, 126, 128, 130 including (or being coupled to a respective CAN bus 101, 102, 103, 104, 105, 106 via) a respective CAN transceiver (or similar communications interface). For example, a first controller 120 may include or be coupled to a first CAN transceiver 140 that is coupled to the first CAN bus 101 and a second CAN transceiver 142 that is coupled to the third CAN bus 103. Similarly, the first flight control computer 110 may include or be coupled to a first CAN transceiver 144 that is coupled to the first CAN bus 101, a second CAN transceiver 146 that is coupled to the second CAN bus 102, a third CAN transceiver 148 that is coupled to the third CAN bus 103, and a fourth CAN transceiver 150 that is coupled to the fourth CAN bus 104. It should be noted that although the subject matter is described herein primarily in the context of CAN buses, the subject matter described herein is not limited to CAN buses and can be implemented in an equivalent manner using other types of communications buses (e.g., avionics full-duplex switched Ethernet (AFDX)), including communication buses or configurations that include more than one transmitter and receiver that share a common physical communication medium.

During operation of the aircraft, each of the flight control computers 110, 112, 114 continually analyzes the outputs of the user interface sensors and the onboard avionics systems to determine corresponding commands for how the respective flight control components should be operated in response to adjustments or changes to the user interface devices substantially in real-time. For each respective flight control component, each of the flight control computers 110, 112, 114 generates a corresponding command that is encoded into a CAN message having a header that identifies the appropriate controller 120, 122, 124, 126, 128, 130 and/or flight control component as the intended recipient for that command, and each of the flight control computers 110, 112, 114 outputs, transmits, or otherwise provides the resultant message to the respective subset of CAN buses 101, 102, 103, 104, 105, 106 that respective flight control computer 110, 112, 114 is connected to. Each of the controllers 120, 122, 124, 126, 128, 130 continually monitors the respective CAN buses 101, 102, 103, 104, 105, 106 it is connected to for messages identifying its associated flight control component as the intended recipient. In response to identifying a message intended for its associated flight control component, the controller 120, 122, 124, 126, 128, 130 decodes, parses, or otherwise analyzes the message to identify the commanded adjustment for its associated flight control component and generates corresponding commands for operating a motor or other actuator to achieve the desired response from the flight control component. In the exemplary embodiments, a cyclic redundancy check (CRC) or similar coding schemes may be utilized to protect against communications errors and improve or ensure the integrity of the messages received by the controllers 120, 122, 124, 126, 128, 130.

The subject matter described herein in the context of FIG. 1 provides independent communication paths that achieve relatively high availability by maintaining support for communications between at least one flight control computer and all of the controllers 120, 122, 124, 126, 128, 130 in the event of an adverse condition or another anomaly or problem with respect to two or more other flight control computers. For example, in an embodiment having three flight control computers, after any one or any two flight control computers experiences problems, the remaining third flight control computer still has the ability to transmit commands to all of the controllers 120, 122, 124, 126, 128, 130. Additionally, a problem with respect to any individual flight control computer or controller cannot adversely degrade all of the CAN buses 101, 102, 103, 104, 105, 106 because no control module is connected to each of the CAN buses 101, 102, 103, 104, 105, 106. In this regard, avoiding fully redundant physical electrical connections between all flight control computers and controllers 120, 122, 124, 126, 128, 130 helps ensure that potential common cause electrical shorts or high voltage faults do not propagate across all CAN buses 101, 102, 103, 104, 105, 106 and/or all flight control computers. Relatively high data integrity may also be achieved using CRCs with CAN messages addressed to individual controllers 120, 122, 124, 126, 128, 130 (in addition to galvanic isolation or other isolation between CAN buses 101, 102, 103, 104, 105, 106). The available bus bandwidth is also improved for aircraft with large numbers of controllers 120, 122, 124, 126, 128, 130 relative to configurations using fewer CAN buses 101, 102, 103, 104, 105, 106.

Figure 2:
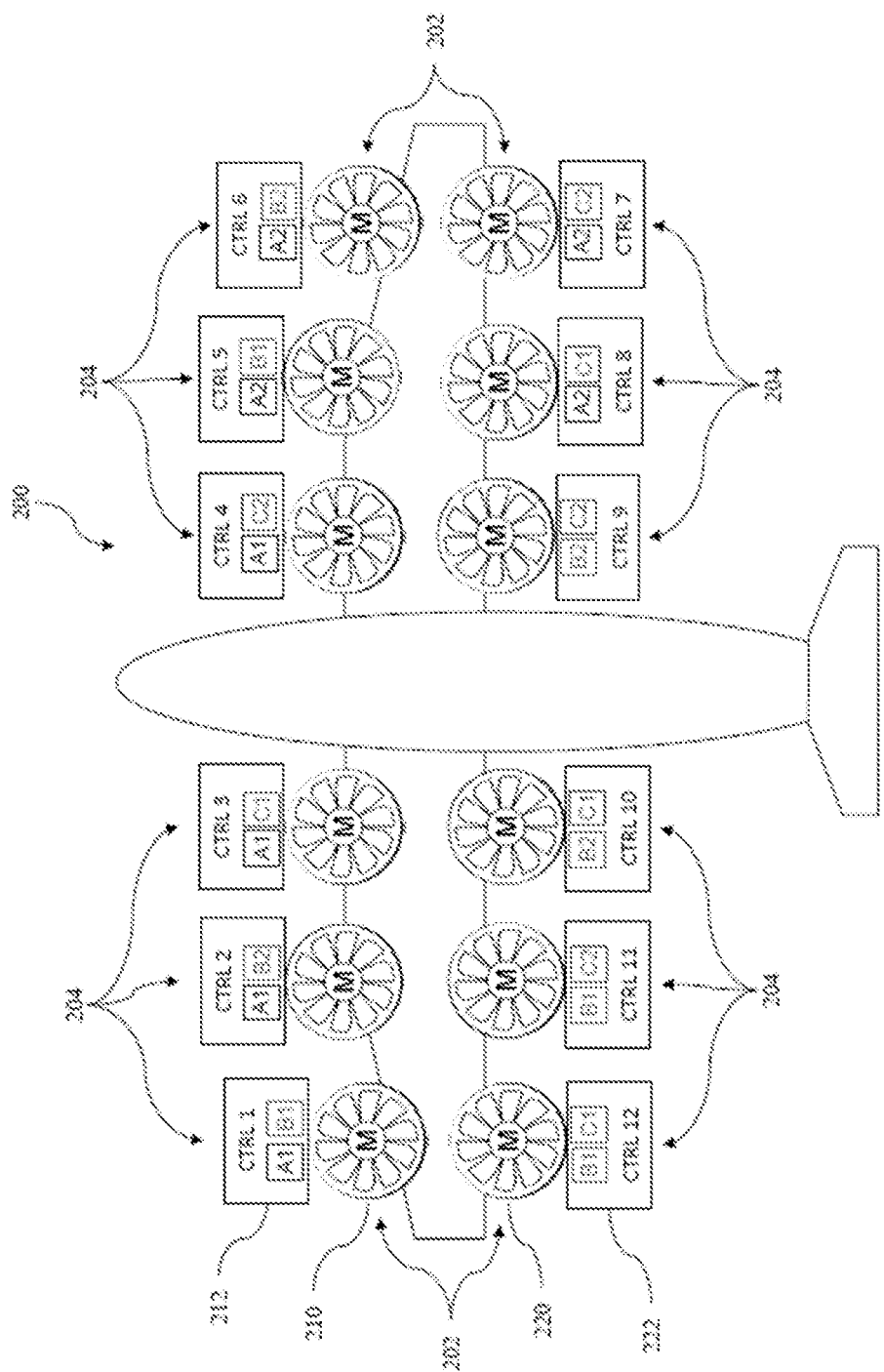
FIG. 2 depicts a vertical take-off and landing (VTOL) aircraft suitable for use with the fly-by-wire system of FIG. 1

It should be noted that the subject matter described herein also alleviates potential single point fault conditions that could affect multiple CAN buses (e.g., a short circuit between two CAN buses, a controller spamming messages onto the CAN buses it is connected to, etc.) by maintaining increased operational availability in response to a fault condition. In this regard, FIG. 2 depicts a VTOL aircraft 200 having twelve flight control components 202 (e.g., lift fans), with each flight control component 202 having a control system 204 (e.g., one or more motor controllers) that are connected to the flight control computers of the VTOL aircraft 200 (e.g., flight control computers 110, 112, 114) via 6 different CAN buses configured in accordance with the fly-by-wire system 100. For example, the controller for a first lift fan 210 may include a first motor controller 212 that is connected to a first subset of the flight control computers (e.g., flight control computers 110 and 114) via a first CAN bus labeled A1 (e.g., bus 101) and is also connected to a different subset of the flight control computers (e.g., flight control computers 110 and 112) via a different CAN bus labeled B1 (e.g., bus 103), and so on.

Referring to FIG. 2 with continued reference to FIG. 1, by virtue of the dual triplex wiring configuration of the fly-by-wire system 100, there are twelve different combinations or subsets of two of the six CAN buses, such that each lift fan control system can be connected to a unique subset of the six CAN buses relative to the other lift fan control systems. As a result, a fault condition with respect to any two CAN buses only impacts operation of one of the twelve lift fans 202. For example, if a fault concurrently impacts both the B1 and C1 CAN buses (e.g., buses 103 and 105), only one of the lift fans (e.g., lift fan 220 having its motor controller 222 connected to the B1 CAN bus 103 and the C1 CAN bus 105) would be potentially be impaired, while the remaining lift fans 202 would maintain communications with at least one flight control computer via at least one CAN bus. For example, in the event of a loss of availability of the B1 CAN bus 103, the first motor controller 212 of the first lift fan 210 maintains communication with at least two of the flight control computers via the A1 CAN bus 101. Accordingly, the fly-by-wire system 100 of FIG. 1 is advantageous for VTOL aircraft or other aircraft that may be less resilient to or tolerant of loss of flight control components by limiting the potential loss of control systems to one twelfth of the total number.

For the sake of brevity, conventional techniques related to fly-by-wire systems, avionics systems, avionics standards, avionics installations, communications buses, communications protocols, encoding and/or decoding, formatting, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Thus, although FIG. 1 may depict direct electrical connections between components, alternative embodiments may employ intervening circuit elements and/or components while functioning in a substantially similar manner.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly coupled to one another, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A vehicle electrical system comprising:
   a bus arrangement comprising a plurality of buses;
   a first control module coupled to a first subset of the plurality of buses, the first subset including a first bus, a second bus, a third bus, and a fourth bus;
   a second control module coupled to a second subset of the plurality of buses, the second subset including the third bus, the fourth bus, a fifth bus, and a sixth bus; and
   a third control module coupled to a third subset of the plurality of buses, the third subset including the first bus, the second bus, the fifth bus and the sixth bus, wherein the first, second and third subsets are different.

2. The vehicle electrical system of claim 1, further comprising a control system coupled to a fourth subset of the plurality of buses, wherein the fourth subset is different from the first second and third subsets.

3. The vehicle electrical system of claim 2, further comprising a second control system coupled to a fifth subset of the plurality of buses, wherein the fifth subset is different from the fourth subset.

4. The vehicle electrical system of claim 3, wherein the fifth subset is different from the first, second and third subsets.

5. The vehicle electrical system of claim 4, wherein the fourth subset comprises the first bus and the third bus and the fifth subset comprises the second bus and the fourth bus.

6. The vehicle electrical system of claim 5, further comprising a first flight control component coupled to the control system and a second flight control component coupled to the second control system.

7. The vehicle electrical system of claim 1, further comprising a control system coupled to a fourth subset of the plurality of buses.

8. The vehicle electrical system of claim 7, further comprising a second control system coupled to a fifth subset of the plurality of buses.

9. The vehicle electrical system of claim 8, wherein the first, second, third, fourth and fifth subsets are different from one another.

10. The vehicle electrical system of claim 7, further comprising a flight control component coupled to the control system, wherein:
the plurality of buses comprises a plurality of controller area network (CAN) buses; and
each of the first control module, the second control module, and the third control module is configured to:
determine a command for operating the flight control component;
generate a CAN message addressed for the flight control component and including the command; and
output the CAN message to the respective one of the first subset, the second subset, and the third subset coupled to the respective one of the first control module, the second control module, and the third control module.

11. The vehicle electrical system of claim 10, wherein the flight control component comprises a lift fan of a vertical takeoff and landing (VTOL) aircraft.

12. The vehicle electrical system of claim 10, further comprising a user interface device coupled to each of the first, second, and third control modules, wherein each of the first control module, the second control module, and the third control module is configured to determine the command for operating the flight control component based at least in part on an adjustment to the user interface device.

13. The vehicle electrical system of claim 1, wherein the plurality of buses comprises a plurality of controller area network (CAN) buses.

14. The vehicle electrical system of claim 1, wherein:
the first control module is not coupled to the fifth and sixth buses;
the second control module is not coupled to the first and second buses; and
the third control module is not coupled to the third and fourth buses.

15. The vehicle electrical system of claim 1, wherein each of the first control module, the second control module, the third control module is isolated from at least two of the plurality of buses.

16. An electrical system suitable for use with an aircraft, the electrical system comprising:
a plurality of communications buses;
a plurality of flight control modules, wherein each of the plurality of flight control modules is connected to a respective subset of the plurality of communications buses that is unique among the plurality of flight control modules; and
a plurality of control modules to manage a plurality of flight control components, wherein each of the plurality of control modules is connected to a respective subset of the plurality of communications buses that is unique among the plurality of control modules and each of the plurality of control modules is communicatively coupled to each of the plurality of flight control modules.

17. The electrical system of claim 16, wherein:
each of the plurality of flight control modules is connected to a respective subset of the plurality of communications buses that includes at least four of the plurality of communications buses; and
each of the plurality of control modules is connected to a respective subset of the plurality of communications buses that includes at least two of the plurality of communications buses.

18. An aircraft fly-by-wire system comprising:
a plurality of controller area network (CAN) buses;
a plurality of flight control modules, wherein each of the plurality of flight control modules is connected to a distinct subset of the plurality of CAN buses; and
a plurality of controllers to manage a plurality of flight control components, wherein:
each of the plurality of controllers is connected to a different subset of the plurality of CAN buses;
each of the plurality of controllers is coupled to each flight control module of the plurality of flight control modules via the different subset of the plurality of CAN buses associated therewith;
each of the plurality of controllers is isolated from at least four of the plurality of CAN buses; and
each flight control module of the plurality of flight control modules is isolated from at least two of the plurality of CAN buses.

19. The vehicle electrical system of claim 1, wherein:
the first control module is isolated from the fifth bus and the sixth bus;
the second control module is isolated from the first bus and the second bus; and
the third control module is isolated from the third bus and the fourth bus.

20. The vehicle electrical system of claim 19, further comprising:
a first controller associated with a flight control component, wherein the first controller is coupled to the first bus and isolated from the second bus, the third bus, the fourth bus, the fifth bus, and the sixth bus; and
a second controller associated with the flight control component, wherein the second controller is coupled to the third bus and isolated from the first bus, the second bus, the fourth bus, the fifth bus, and the sixth bus.

* * * * *